F. A. Pratt,
Friction Clutch.
N° 29,939. Patented Sep. 4, 1860.
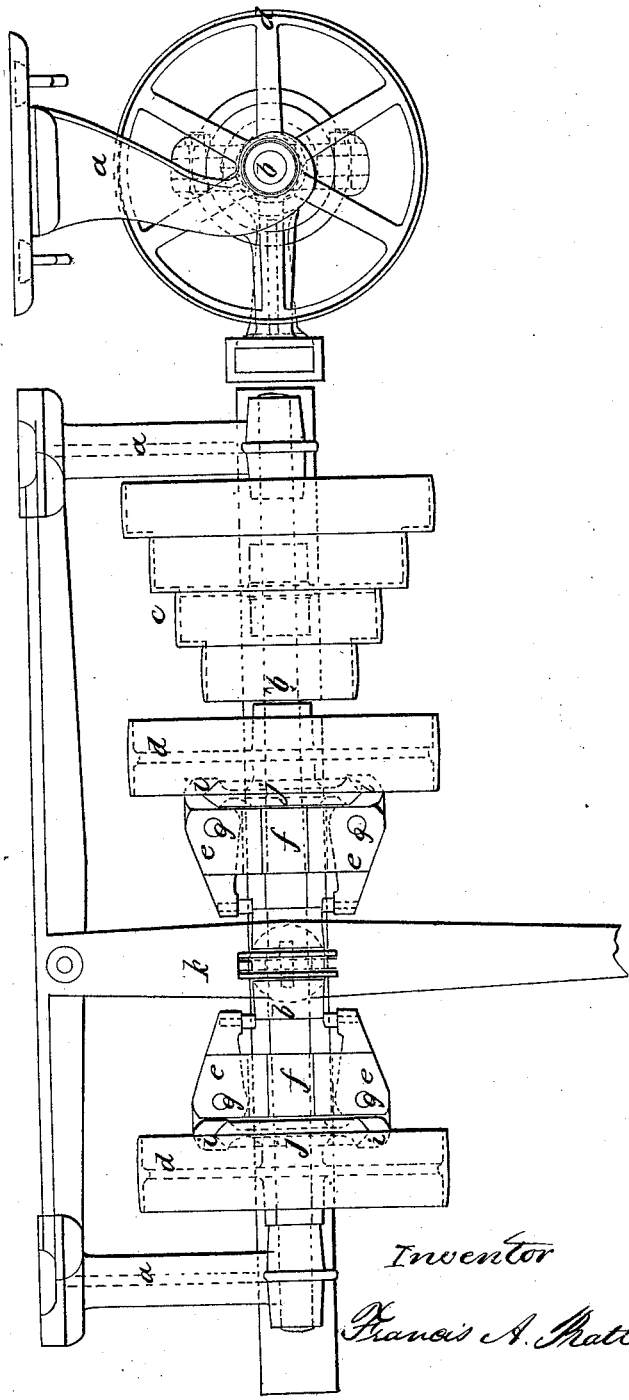
Witnesses
Enos H. Lane
Jeremy W. Briggs
Inventor
Francis A. Pratt

UNITED STATES PATENT OFFICE.

FRANCIS A. PRATT, OF HARTFORD, CONNECTICUT, ASSIGNOR TO HIMSELF AND GEO. S. LINCOLN & CO.

IMPROVEMENT IN DEVICES FOR STOPPING AND CHANGING MOTION.

Specification forming part of Letters Patent No. 29,939, dated September 4, 1860.

*To all whom it may concern:*

Be it known that I, FRANCIS A. PRATT, of Hartford, county of Hartford, and State of Connecticut, have invented certain new and useful Improvements in Devices for Stopping and Starting or for Changing the Direct or Reverse Motion of Counter-Shafts; and I do hereby declare that the same is described and represented in the following specification and drawings.

To enable others skilled in the art to make and use my said improvement, I will proceed to describe its construction and operation, referring to the drawings, in which the same letters indicate like parts in each of the figures.

The nature of this improvement consists in the construction and arrangement of a proper clamp or friction device, for the purpose of stopping or of changing the back and forward motion of a counter-shaft for lathes, &c., where two loose pulleys are used on the counter-shaft and driven by one straight or open belt, and the other by a cross-belt; or, in other words, it consists in the arranging of a proper clamp or friction device on a counter-shaft between two loose driving-pulleys (or by the side of one loose driving-pulley) driven from the main shaft by an open belt and a cross-belt so as to produce opposite motion, so that the said pulleys or pulley may be made tight alternately by the action of the said device.

In the accompanying drawings, $a$ are the hangers, which support and hold the counter-shaft $b$ in its proper place.

$c$ is a cone-pulley, by means of which the motion or power is transmitted from the counter-shaft to the cone-pulley or spindle of the lathe or machine requiring a double motion.

$d$ are the loose pulleys, one of which receives a straight belt from the main shaft and the other a cross-belt from the main shaft.

$e$ are the clamps or friction-arms, secured to or on the collar $f$ by fulcrum-pins $g$, or in some other suitable manner, so as to hold them firmly in their proper place upon the counter-shaft $b$ and between the pulleys $d$.

The collar $f$ is secured to the shaft $b$ by set-screws, keys, &c. The clamp-ends $i$ are fitted to the edge of a beveled or V-shaped collar, $j$, which is made on or secured to the pulleys $d$, and is so fitted to the said beveled or V-shaped-edge collar $j$ that, when not in use, the collar, with the pulley $d$, will revolve free and without noise or friction.

In the center, or between the ends of the clamp-arms and upon the shaft $b$, is a sliding wedge-shaped collar, $l$, having a groove or flanges such as are commonly used with a clutch for changing motion.

$k$ is a lever having a clutch secured thereto, for the purpose of moving the wedge-shaped collar $l$.

Now, it will be seen that when the machine is at rest the wedge-shaped collar is nearly central between the two clamp-arms $e$, and the pulleys $d$, which have the bevel or V-shaped-edge collar $j$, are allowed to revolve freely on the shaft $b$; and when it is desirable to start the machine with a forward motion the handle $k$ is moved in the direction to produce that result, and in thus moving it the collar $l$ is moved inward between the outer ends of the clamps $e$, while the clamp ends take fast hold of the collar $j$, and in moving the handle $k$ the other way will produce the opposite motion. Thus the motion is changed as quickly as desired, without noise, breaking, or damaging the machinery or work being executed. It will also be observed that this clamp will afford the same advantage on counter-shafts having but one loose driving-pulley instead of having a tight and loose pulley, as in the common way.

I also propose to apply this device as a fastener to pulleys on a line-shaft, so that pulleys not constantly in use may stand idle, while the shaft is free to turn in its eye, for the purpose of saving power required for driving the said pulleys.

I believe I have described the nature and character of my improvement so as to enable a person skilled to make and use the same.

I claim—

1. The combination of the levers or clamps $e$, disk or collar $j$, substantially as and for the purpose described.

2. The application of a wedge-collar, $l$, or its mechanical equivalent, for the purpose of operating the said levers or clamps $e$, as described.

FRANCIS A. PRATT. [L. S.]

Witnesses:
ENOS H. LANE,
JEREMY W. BLISS.